Patented Feb. 26, 1924.

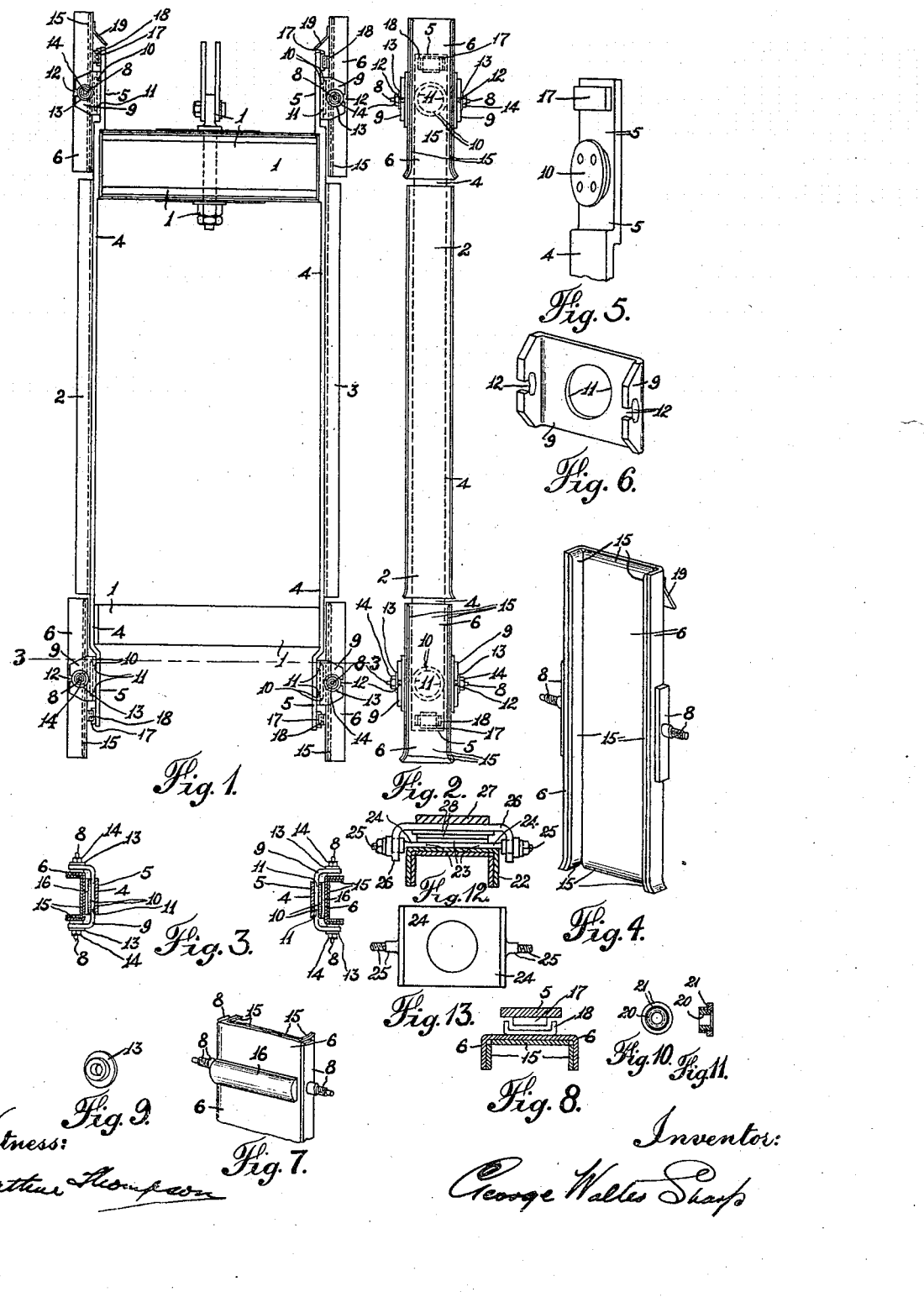
Feb. 26, 1924.　　　　　　　　　　　　　　　　　　　1,485,302
G. W. SHARP
RUNNER OR GUIDING MEANS OF MINE SKIPS, CAGES, AND OTHER VEHICLES
EMPLOYED IN VERTICAL SHAFTS
Filed Aug. 31, 1922

1,485,302

UNITED STATES PATENT OFFICE.

GEORGE WALTER SHARP, OF JOHANNESBURG, TRANSVAAL, SOUTH AFRICA.

RUNNER OR GUIDING MEANS OF MINE SKIPS, CAGES, AND OTHER VEHICLES EMPLOYED IN VERTICAL SHAFTS.

Application filed August 31, 1922. Serial No. 585,437.

*To all whom it may concern:*

Be it known that I, GEORGE WALTER SHARP, a subject of the King of Great Britain, and resident of Johannesburg, Transvaal Province, Union of South Africa, have invented certain new and useful Improvements Appertaining to the Runners or Guiding Means of Mine Skips, Cages, and Other Vehicles Employed in Vertical Shafts, of which the following is a specification.

This invention relates to the shoes, slippers or runners of mine skips, cages and other vehicles used in vertical mine shafts, for guiding the same as they travel up and down the shaft. The invention is applicable to other similar vehicles which require to be guided as they ascend and descend a vertical shaft, or the like.

It is now the practice rigidly to secure the runners, shoes or slippers to the drawbar or equivalent part of the framework of the skip, cage, et cetera. The runners, et cetera, engage with the guides provided in the mine shaft, so that the vehicle is thereby guided as it ascends and descends the shaft. Considerable wear and tear takes place on both the runners and guides and more or less serious damage to the vehicles and shaft equipment is occasioned, owing to such excessive wear and tear arising from irregularities in the guides and from other causes.

By the adoption of my invention improved or better and more uniform contact between the rubbing or contacting surfaces of the runners and guides is obtained, thereby minimizing jar and vibration and effecting a considerable saving in the cost of maintaining the guides and shaft timbering in good repair; a great saving of time and labour is effected in replacing worn runners, as slippers fitted with new liners or wearing strips can be inserted in a comparatively short period of time and while the skip or cage is suspended on the hauling rope, instead of, according to the prevailing practice, removing the skip to the repair shop; increased life of wearing strips or liners for the runners is obtained; the risk of jamming the skip, et cetera, and/or ripping the guides, so liable with uneven guides, is eliminated, which conduces to greater safety and immunity from accident with possible attendant loss of life and serious damage to shaft, et cetera; increased comfort for those travelling in skips or cages on account of easier and smoother running is obtained; more uniform strain on hoisting rope and winding engine results, tending to prolong the life of the former; there is considerable reduction in maintenance costs of skips and cages from reduced vibration and consequent reduction in wear and tear; and an increased hauling speed is permissible owing to safer and smoother running admitting of increased haulage capacity.

According to this invention I provide the skip, cage or other vehicle, preferably both top and bottom, with swivel guide runners, or with swivel sections or portions of the runners, on both sides of the drawbar, frame or its equivalent, carrying the vehicle.

The swivel runners, or swivel sections of the runners, are preferably pivoted or mounted so that they can move preferably in two planes at right angles, like or on the principle of a universal joint.

The invention will be fully described in connection with the accompanying drawings, wherein Fig. 1 is an elevation of the frame of a rock skip, incorporating the invention.

Fig. 2 is a side elevation of Fig. 1.

Fig. 3 is a section of Fig. 1 on line 3—3.

Fig. 4 is a perspective view of one of the swivel runners, detached and drawn to an enlarged scale.

Fig. 5 is a perspective view of portion of the upper end of one of the drawbars or drawbar extensions with the trunnion plate 10 and one part of the stop 17 affixed thereto.

Fig. 6 is a perspective view of one of the trunnion brackets 9.

Fig. 7 is a perspective view of portion of one of the runners 6 as seen from the opposite side to Fig. 4.

Fig. 8 is a cross-section of the drawbar and runner, illustrating the parts which constitute the stop 17.

Fig. 9 is a perspective view of one of the bushes 13 for the sides of the trunnion brackets 9.

Figs. 10 and 11 are elevation and section respectively, of a modified construction for the trunnion bracket bush.

Fig. 12 is a cross-section of the drawbar and runner, illustrating a slightly modified form of the invention, and Fig. 13 is an elevation of the swivel plate, detached, of the arrangement shown in Fig. 12.

Referring more particularly to Figs. 1 to 9, the numeral 1 denotes the various members of the frame of the skip or vehicle; 2, 3, being the portions of the shoes, slippers or runners and/or stiffening or strengthening members which are fixed to the drawbars or members 4 of the frame. The drawbars 4 are constructed at both the top and bottom of the skip with extensions 5, which carry the several swivel runners 6. As all the swivel runners or swivel runner sections 6 are shown of identical construction, it will suffice to describe one of them. The swivel runner or swivel runner section 6 is constructed at the two sides with trunnions or pivots 8 which serve for permitting of the pivotal movement of the runner or section in one plane. All the runners 6 are of ordinary U or channel section to engage with the guides (not shown) and they are arranged and supported through the medium of the trunnion 8 by trunnion brackets 9, which are pivotally or rotatably mounted upon trunnions 10 fixed to the outer surfaces of the drawbars 4. The drawbar extensions 5, as shown,—see Fig. 5—may be shaped or bent inwardly so as to bring the runners 6 substantially in line with the fixed runners or stiffening members 2, 3.

The trunnion brackets 9—see Fig. 6—are provided with central circular holes 11 so that each bracket 9 is adapted to move on its trunnion or pivot 10 which is riveted— see Fig. 5—to the inner side of the drawbar 4. The trunnion plate forming the trunnion 10 is riveted to the end of the drawbar 4 or drawbar extension 5 after the trunnion bracket 9 has been arranged in position on the trunnion 10. The trunnion bracket 9 is constructed at the sides with openings 12 to receive the trunnions 8 on the sides of the swivel runner 6. In these openings 12, bushes 13—see Fig. 9—are arranged around the trunnion 8 and the latter is screw-threaded in its outer portion to receive the fixing nut 14.

The trunnion bracket 9 allows the swivel runner 6 to move with it around the trunnion 10 on the drawbar 4 in a plane parallel to the face of the guide and at right angles to the pivots or trunnions 8.

The swivel runner is, as shown, lined on the inner face and sides with liners or lining plates 15.

On the back of the swivel runner 6 there is provided a piece or member 16 which is rounded or curved—see Fig. 7—on the side opposite the trunnion or trunnion plate 10, against which latter it bears, so that the rounded or curved surface of said member 16 can roll on the face of the trunnion plate when the swivel runner moves in a direction towards or away from the face of the guide.

A stop 17 is provided for limiting the movement of the swivel runner in a plane parallel to the face of the guide. The stop is shown comprising a plate or piece riveted to the end of the drawbar 4 or drawbar extension 5 and a U-shaped piece 18 fixed to the back of the swivel runner 6. 19 represent guard plates fixed to the inside of the top swivel runners 6 over the tops of the parts of the swivels and pivots between the runners and the drawbars 4.

In Figs. 10 and 11 I show a modified form of the bush for the openings in the trunnion bracket. In this construction an annular rubber piece 20 is fitted inside a metal outer piece 21. By the use of the resilient lining for the bush, the vibration in the swivel runner sections is further minimized with a consequent further reduction in vibration in the skip or vehicle structure. The rubber lining also serves to make a better joint between the parts.

In the modified construction shown in Figs. 12 and 13, the swivel runner 22 has riveted or otherwise fixed to it the trunnion plate 23. The main swivel plate 24, which has a hole for the trunnion or trunnion plate 23, carries the swivel pins or pivots 25 at either side, the swivel pins 25 being in turn pivotally supported in a bracket plate 26 riveted or otherwise fixed to the drawbar 27. 28 is the rocker bar carried by the bracket plate 26 and bearing on the trunnion plate 23.

What I claim as my invention and desire to protect by Letters Patent is:—

1. Guiding means for mine skips, cages and similar vehicles, comprising swivel guide runners which are adapted to swivel in two planes at right angles to each other, as set forth.

2. Guiding means for mine skips, cages and similar vehicles, comprising swivel guide runners adapted to swivel in two directions at right angles to each other, pivots for said runners, the centre line of the one pivot passing through the centre of the other pivot, as set forth.

3. Guiding means for mine skips, cages and similar vehicles, comprising, for each guided side of the vehicle and for both the top and bottom of the vehicle, a trunnion fixed to the drawbar, a trunnion bracket rotatably mounted on said trunnion and a swivel runner section pivotally mounted on the trunnion bracket, as set forth.

4. Guiding means for mine skips, cages and similar vehicles, comprising, for each guided side of the vehicle and for both the top and bottom of the vehicle, a trunnion fixed to the drawbar, a trunnion bracket rotatably mounted on said trunnion and a swivel runner section pivotally mounted on the trunnion bracket in such a way that said runner section can move in a plane at right angles to the plane in which the trunnion bracket moves about the trunnion, as set forth.

5. Guiding means for mine skips, cages and similar vehicles, comprising, for each guided side of the vehicle and for both the top and bottom of the vehicle, a trunnion fixed to the drawbar, a trunnion bracket rotatably mounted on said trunnion, and a swivel runner section pivotally mounted on the trunnion bracket in such a way that said runner section can move in a plane at right angles to the plane in which the trunnion bracket moves about the trunnion, the swivel runner sections being provided at the back with rounded or curved surfaces or members which roll on the faces of the trunnions, as set forth.

6. Guiding means for mine skips, cages and similar vehicles, comprising swivel guide runners, and stops for limiting the movement of the runners, as set forth.

In testimony whereof I have signed my name to this specification in the presence of two subscribing witnesses.

GEORGE WALTER SHARP.

Witnesses:
CHAS. OVENDALE,
ARTHUR W. HACKER.